(12) United States Patent
Arman et al.

(10) Patent No.: US 6,604,364 B1
(45) Date of Patent: Aug. 12, 2003

(54) THERMOACOUSTIC COGENERATION SYSTEM

(75) Inventors: Bayram Arman, Grand Island, NY (US); Dante Patrick Bonaquist, Grand Island, NY (US); John Henri Royal, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/301,706

(22) Filed: Nov. 22, 2002

(51) Int. Cl.[7] .................................................. F25B 9/00
(52) U.S. Cl. .................................. 62/6; 60/520; 62/467
(58) Field of Search ........................ 62/6, 467; 60/517, 60/520

(56) References Cited

U.S. PATENT DOCUMENTS

| | | | |
|---|---|---|---|
| 5,647,216 A | * 7/1997 | Garrett | 62/6 |
| 5,996,345 A | 12/1999 | Hofler | 60/517 |
| 6,205,812 B1 | 3/2001 | Acharya et al. | 62/607 |
| 6,425,250 B1 | 7/2002 | Acharya et al. | 62/6 |

OTHER PUBLICATIONS

Swift, "Thermoacoustic Engines and Refrigerators", Physics Today (1995) pp 22–28.

* cited by examiner

Primary Examiner—Ronald Capossela
(74) Attorney, Agent, or Firm—Stanley Ktorides

(57) ABSTRACT

A method for operating a thermoacoustic engine which produces acoustic energy which may be used to generate refrigeration wherein energy delivery fluid from a hot energy source, which provides heat to the thermoacoustic engine, is used to provide heat to a first heat sink such as a Kalina cycle and then at a lower temperature to a second heat sink.

8 Claims, 3 Drawing Sheets

THERMOACOUSTIC COGENERATION SYSTEM

TECHNICAL FIELD

This invention relates generally to thermoacoustic technology, and is particularly advantageous for employing thermoacoustic technology to generate refrigeration.

BACKGROUND ART

A thermoacoustic engine is a device that employs a tube-containing hot and cold end heat exchangers thermally linked by a stack of parallel plates or by a regenerator matrix to convert thermal energy to acoustic or pressure energy. The work of the acoustic energy can be used to produce mechanical work, electricity or refrigeration. The thermal energy provided to the thermoacoustic engine is typically not fully used in the thermoacoustic engine to generate the acoustic energy. A system for effectively employing the remnant thermal energy from a thermoacoustic engine would be highly desirable.

Accordingly, it is an object of this invention to provide a system for employing remnant thermal energy from a thermoacoustic engine.

SUMMARY OF THE INVENTION

The above and other objects, which will become apparent to those skilled in the art upon a reading of this disclosure, are attained by the present invention, one aspect of which is:

A method for employing heat energy comprising:

(A) providing heat from a hot energy source to a thermoacoustic engine, and employing said heat in the thermoacoustic engine to produce acoustic energy;

(B) using heat from the hot energy source to produce an energy delivery fluid having a temperature within the range of from 350 to 750° C., and cooling the energy delivery fluid to a temperature within the range of from 100 to 400° C. by providing heat from the energy delivery fluid to a first heat sink; and (C) passing the cooled energy delivery fluid to a second heat sink and providing heat from the cooled energy delivery fluid to the second heat sink.

Another aspect of the invention is:

A method for employing heat energy comprising:

(A) employing heat from a hot energy source to produce hot energy delivery fluid having a temperature within the range of from 500 to 1200° C., and providing heat from the hot energy delivery fluid to a thermoacoustic engine to produce acoustic energy, said provision of heat resulting in the energy delivery fluid having a temperature within the range of from 350 to 750° C.;

(B) cooling the energy delivery fluid to a temperature within the range of from 100 to 400° C. by providing heat from the energy delivery fluid to a first heat sink; and (C) passing the cooled energy delivery fluid to a second heat sink and providing heat from the cooled energy delivery fluid to the second heat sink.

As used herein the term "heat sink" means a colder media or process which cools a hotter energy delivery fluid.

Figure 1:
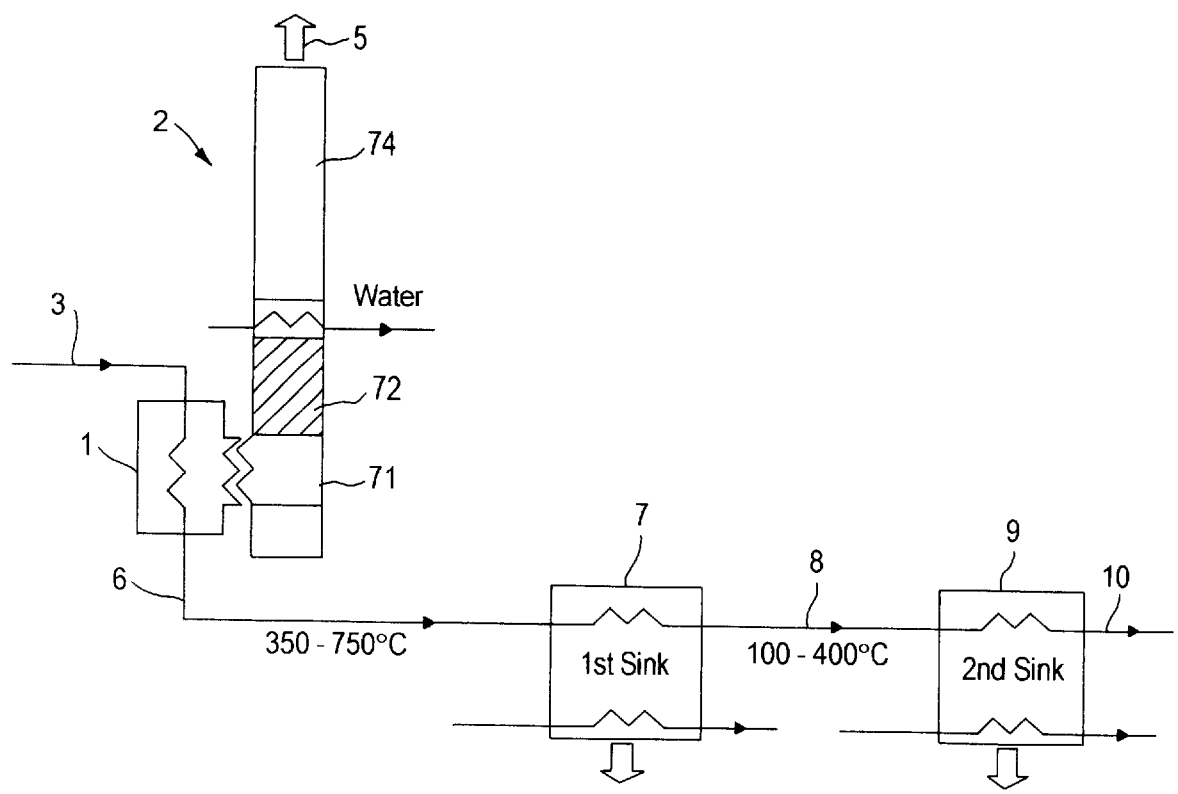
FIG. 1 is a representation of one embodiment of the invention wherein the hot energy source provides heat to the thermoacoustic engine without employing an intervening energy delivery fluid.

The numerals in the Drawings are the same for the common elements.

DETAILED DESCRIPTION

Figure 2:
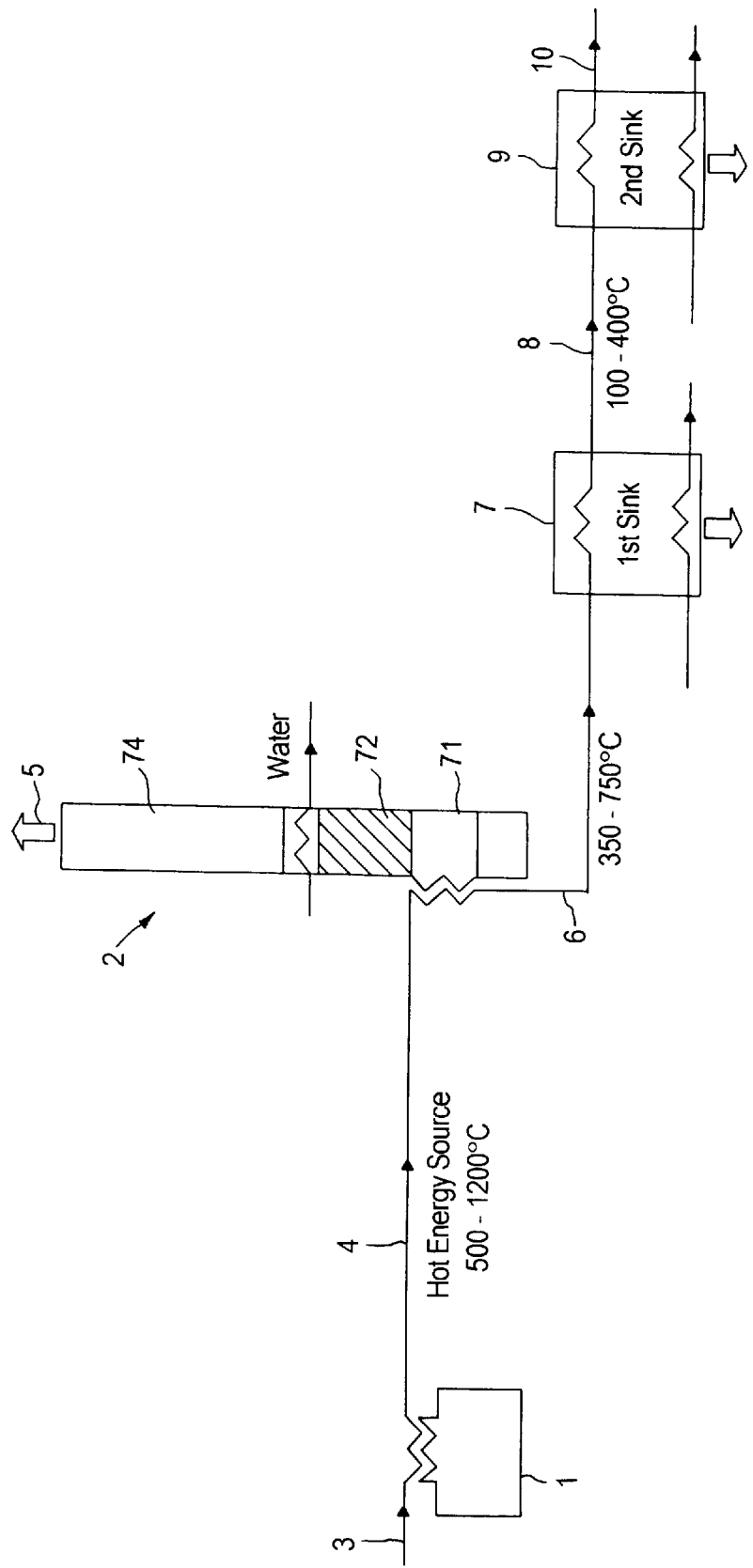
FIG. 2 is a representation of another embodiment of the invention wherein heat from the hot energy source is provided to the thermoacoustic engine using an energy delivery fluid which subsequently provides heat in serial fashion to two downstream heat sinks.

The invention will be described in detail with reference to the Drawings. Referring now to FIGS. 1 and 2, heat is generated in hot energy source 1. One example of a hot energy source which may be used in the practice of this invention is a combustion zone wherein fuel, such as methane, propane or natural gas, and oxidant, such as air or a fluid having an oxygen concentration greater than that of air, are provided to the combustion zone and combust to generate heat. Other examples of a hot energy source include high temperature steam, a hot process stream, a hot waste stream, flue gas from a furnace, and fuel cell exhaust gas.

Heat from hot energy source 1 is provided to thermoacoustic engine 2 wherein it is used to produce acoustic energy. In the embodiment of the invention illustrated in FIG. 1, the heat from hot energy source 1 is provided to thermoacoustic engine 2 without employing an energy delivery fluid. Some of the oscillating thermoacoustic engine working media could be internally converted to direct current flow by utilizing jet pumps. This direct current flow stream will flow into the hot energy source and picks up the heat and mixes with the thermoacoustic engine working media. The combustion chamber exhaust gases pass through the thermoacoustic engine hot heat exchanger and transfers heat into the thermoacoustic engine working media. In the embodiment of the invention illustrated in FIG. 2, an energy delivery fluid 3 is provided to hot energy source 1 and is heated by indirect heat exchange to a temperature within the range of from 500 to 1200° C. The resulting hot energy delivery fluid 4 provides heat from the hot energy source to the thermoacoustic engine by indirect heat exchange.

The heat or thermal energy from hot energy source 1 is used to generate acoustic or pressure pulse energy in thermoacoustic engine 2. Thermoacoustic engines and their operation are known. A good description of thermoacoustic engines may be found at Physics Today, "Thermoacoustic Engines and Refrigerators", Gregory W. Swift, pp. 22–27, July 1995. The acoustic energy or acoustic work produced by thermoacoustic engine 2, represented by arrow 5, may be used to generate electricity by being provided to a generator, such as a linear generator, or may be used to generate refrigeration by being provided to an acoustic refrigerator such as a pulse tube refrigerator, or may be converted to shaft work by mechanical means. The thermoacoustic engine is typically a standing wave thermoacoustic engine or a traveling wave thermoacoustic engine or a hybrid of the two. A standing wave thermoacoustic engine is comprised of an elongated vessel sealed at each end which is driven by the application of heat to one end of the vessel. A compressible fluid, such as helium, is contained by the vessel. Heat is applied to hot heat exchanger 71 of the thermoacoustic engine. The source of heat may be from the combustion of fuel, or may be obtained as waste heat from some unrelated process. A thermodynamic element 72, comprising a stack of parallel plates, is adjacent to the heat exchanger 71 and converts some of the heat transmitted by the heat exchanger to acoustic power. The end of the stack of plates farthest from the heat source is in thermal contact with an ambient heat exchanger. The acoustic power flows out of the resonator 74 as an output from this system. Resonator 74 amplifies and tunes the frequency of the acoustic wave. In a traveling wave engine (not shown) some of the acoustic energy produced is circulated to the ambient end of the regenerator within a torus and a resonator branch may be connected to the torus for transferring acoustic energy out of the torus while amplifying and tuning the frequency of the acoustic oscillations. A regenerator is located in the torus with a heat exchanger located on the downstream side of the regenerator, and a second heat exchanger is located on the upstream side of the regenerator. Also included is a thermal buffer column in the torus to thermally isolate the heat exchanger that is at the operating temperature of the system.

As mentioned, energy delivery fluid 3 is provided to hot energy source 1 and is heated by the provision therein of heat from the hot energy source. In the embodiment of the invention illustrated in FIG. 1, the energy delivery fluid is heated to a temperature within the range of from 350 to 750° C. since a portion of the heat from the hot energy source is being passed simultaneously to the thermoacoustic engine. In the embodiment of the invention illustrated in FIG. 2 the energy delivery fluid is heated to a temperature within the range of from 500 to 1200° C. and this hot energy delivery fluid 4 is used to provide heat to the thermoacoustic engine, resulting in the energy delivery fluid having a temperature within the range of from 350 to 750° C. In each embodiment, the energy delivery fluid after the heat exchange with the hot energy source (FIG. 1) or the thermoacoustic engine (FIG. 2), which has a temperature within the range of from 350 to 750° C., is shown as energy delivery fluid 6. Examples of fluids which may be used as the energy delivery fluid or heat transfer fluid in the practice of this invention include hot process streams, flue gases, hot steam, furnace exhaust gases and heat transfer fluids such as air.

Energy delivery fluid 6, which has a temperature within the range of from 350 to 750° C., is provided to a first heat sink. Energy delivery fluid 6 provides heat to first heat sink 7 and in so doing is cooled to a temperature within the range of from 100 to 400° C. The resulting cooled energy delivery fluid having a temperature within the range of from 100 to 400° C. is passed from first heat sink 7 in stream 8. Generally the temperature of the cooled energy delivery fluid in stream will be at least 100, and preferably at least 350, degrees Celsius less than the temperature of the energy delivery fluid in stream 6. The heat sinks shown in FIGS. 1 and 2 indicate the use of the energy available in entering streams 6 and 8. The use of this energy can include such systems as: absorption heat pump, domestic heat loads, space conditioning, electric generation and thermoacoustic/thermoionic devices. In the arrangement illustrated in FIG. 1, stream 3 can be conveying a fluid such as water or steam depending upon its initial condition (not specified). The hot energy source can be waste heat from a process or the combustion of a fuel. A portion of this heat can be picked up by the thermoacoustic engine directly from process 1, the remainder of the heat generated by 1 is transferred to stream 3 and passed to the first heat sink in stream 6. The energy received by thermoacoustic engine 2 is utilized in generating some form of energy such as electric power from a linear alternator at point 5. Some of the energy in stream 6 is utilized by the first heat sink 7, (possibly generating electricity) and as a result the temperature of stream 6 is reduced somewhat in effluent stream 8. The stream passing through the lower portion of the first heat sink may be water or ambient air to dissipate the heat while generating useful energy/work in the device 7. Device number 7 may be a Kalina cycle, multi- or single-fluid Rankine cycle, Stirling engine, thermoelectric/thermionic device. The heavy arrow below the first heat sink indicates that there is some output available (useful energy as work, heat or electricity) from the system involved in the first heat sink. Stream 8, now at a lower temperature, is transferred to the second heat sink 9. The use of the energy available in stream 8 may be typified in a Kalina cycle, a multi- or single-fluid Rankine cycle, thermoelectric/thermionic devices or a source of domestic heat leaving the second heat sink as stream 10 at a low temperature. The unnumbered stream at the lower portion of the second heat sink could be a heat transfer stream to deliver this energy to another location or dissipate into ambient via aircooling or water. Again, the bold arrow below the second heat sink indicates the output of useful energy as work, heat or electricity from this process. The arrangement illustrated in FIG. 2 differs from that of FIG. 1 in that the hot energy source is separated from the thermoacoustic engine, and heat energy is delivered to the thermoacoustic engine by way of stream 4.

Among the processes which can be used as the first heat sink in the practice of this invention one can name a Kalina cycle, a multifluid Rankine cycle, the operation of a thermoelectric device, the operation of a thermoionic device and the operation of a Stirling engine.

Figure 3:
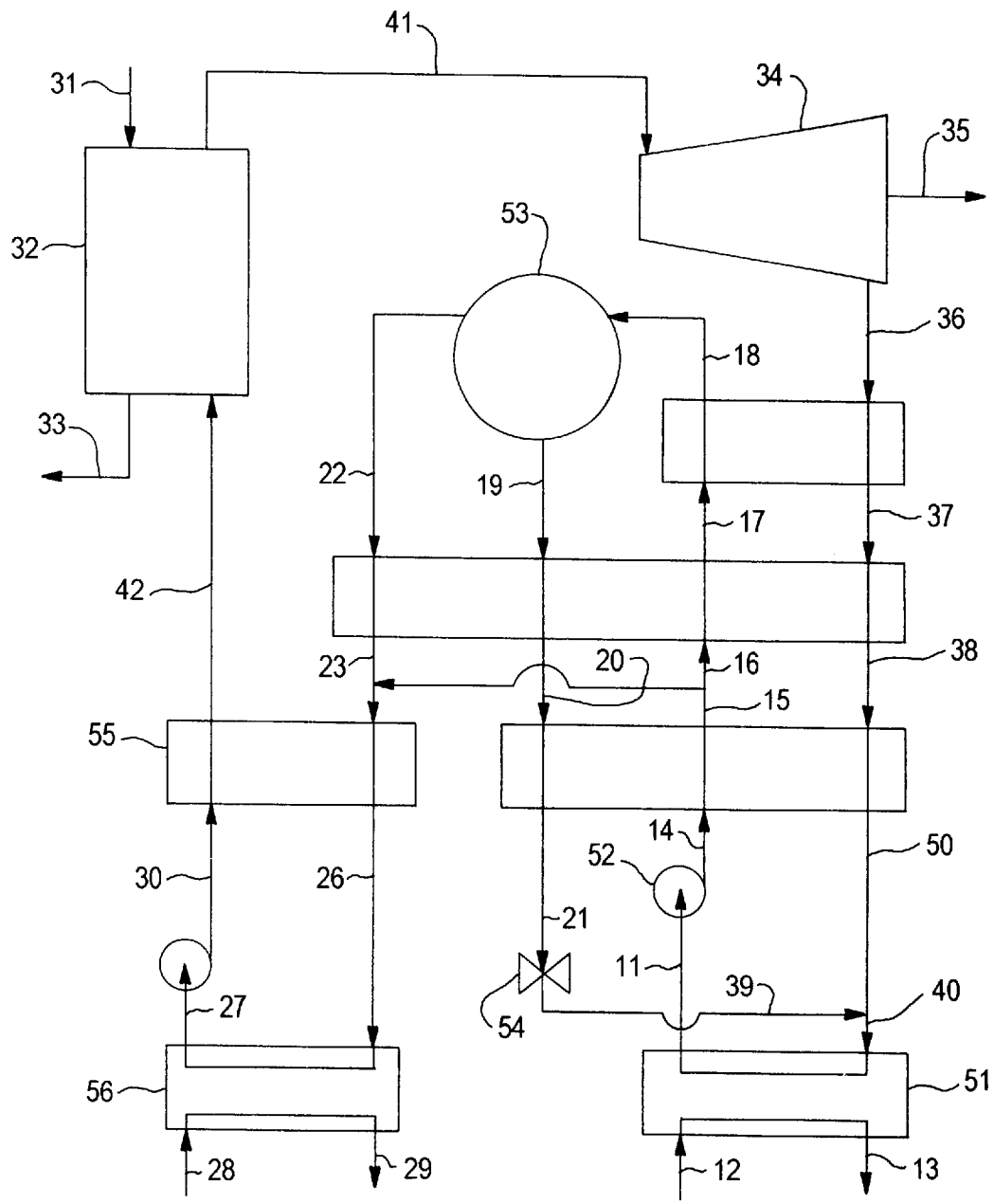
FIG. 3 is a simplified schematic diagram of a Kalina cycle which may be used as one or both of the heat sinks in the practice of this invention.

FIG. 3 illustrates one embodiment of a Kalina cycle which can be used as a heat sink in the practice of this invention. The Kalina cycle shown in FIG. 3 uses a 70 percent mixture of ammonia in water as the working fluid to recover heat more efficiently than the standard, Rankine cycle. The energy delivery fluid provides heat by passage in stream 31 to boiler 32 emerging therefrom as stream 33. Superheated ammonia-water mixture 41 is expanded in turbine 34 to produce work 35. The turbine exhaust 36 is cooled in heat exchangers connected by streams 37 and 38 and resulting stream 50 is diluted with stream 39 having a low concentration of ammonia to form stream 40. Stream 40 is then condensed in the absorber 51 by cooling water 12–13. The saturated liquid 11 leaving the absorber is pumped by pump 52 to an intermediate pressures in stream 14 and warmed by the heat exchangers using interconnecting streams 15, 16, 17 and 18. The saturated mixture is separated in separator 53 into a weak ammonia liquid 19, which is cooled in the heat exchangers connected by streams 20 and 21, and then expanded through valve 54 into stream 39. Ammonia-rich vapor 22 is cooled which then has some of the condensate added to bring the ammonia concentration up to about 70 percent. The mixture 23 is then cooled in the feedwater heater 55 and stream 26 transfers the working fluid to condenser 56. Here the ammonia-rich stream is condensed by cooling water 28–29. The condensate 27 is then pumped through pump 57 and stream 30 is passed to the feedwater heater 55 and then to boiler 32 as stream 42, completing the cycle. The loop through the separator and absorber makes the necessary changes in composition possible. By changing the condensing temperature of the mixture, the waste heat from the turbine exhaust, normally lost in the Rankine cycle, can be used to dilute the ammonia vapor with water, thereby producing a mixture considerably lower in ammonia which allows the condensation at a much higher temperature.

A Rankine cycle engine operating on a binary-fluid mixture of ammonia and water can be used as a bottoming cycle which uses heat from the energy delivery fluid. This has a higher efficiency and occupies a smaller space than standard Rankine cycles employing single-component fluids. It has about the same efficiency as the binary-fluid Kalina cycle. The binary-fluid Kalina cycle uses separators and additional heat exchangers to vary the mixes of ammonia and water throughout the cycle thus requiring more space and additional cost. The binary-fluid Rankine cycle includes a boiler/superheater, a turbine, a condenser, a pump and a recuperative heat exchanger. The heat driving the cycle is derived from the energy delivery fluid. The turbine extracts useful work from the "waste" heat. The condenser completes the job of removing the final energy from the "waste" heat. The recuperative heat exchanger recovers some of the heat, thus recycling some of the heat that otherwise would have been lost through the condenser. This boosts the efficiency of the cycle. This is possible because of the larger variation of the saturation temperature of the ammonia-water mixture by virtue of the change in composition of the vapor fraction during boiling. This cycle is used to recover waste heat from a low temperature source which in the invention is the energy delivery fluid.

The cooled energy delivery fluid, having a temperature within the range of from 100 to 400° C. and shown as stream 8 in FIGS. 1 and 2, is passed to a second heat sink 9 and provides heat to the second heat sink, emerging therefrom in stream 10. Among the processes which can be used as the second heat sink in the practice of this invention one can name a Kalina cycle, a multifluid Rankine cycle, the operation of a thermoelectric device, the operation of a thermoionic device, the operation of a Stirling engine, and an absorption heat pump cycle. In an absorption heat pump cycle, the heat from the energy delivery fluid is used to desorb refrigerant from a high pressure absorbent heat pump solution with the resulting refrigerant expanded to generate refrigeration prior to being reabsorbed by the absorbent. A thermoelectric device takes advantage of the Seebeck effect which states that when two dissimilar conductors are made into a circuit, a current will flow as long as the junctions are at different temperatures. The thermoelectric device can also take advantage of the Peltier effect which states that when an electric current flows across a junction of two dissimilar conductors, heat is liberated or absorbed. A thermionic converter is a static device that converts heat into electricity by boiling electrons from a hot emitter surface (about 250–700° C.) to a cooler collector surface about (0–350° C.). Since this is a form of a heat engine, it is limited by the Carnot efficiency, at best. Typical devices are thermionic diode rectifier, vacuum diode, plasma diode and superlattice diode. A Stirling engine comprises a compressor, an aftercooler, a regenerator, a cold heat exchanger, and an expander. The compressor generates the pressure to drive the process. An aftercooler removes the heat of compression. The compressed fluid passes through the regenerator exchanging heat with it. The expander extracts work from the fluid cooling it. The work of expansion is generally recovered.

Although the invention has been described in detail with reference to certain preferred embodiments, those skilled in the art will recognize that there are other embodiments of the invention within the spirit and the scope of the claims.

What is claimed is:

1. A method for employing heat energy comprising:

(A) providing heat from a hot energy source to a thermoacoustic engine, and employing said heat in the thermoacoustic engine to produce acoustic energy;

(B) using heat from the hot energy source to produce an energy delivery fluid having a temperature within the range of from 350 to 750° C., and cooling the energy delivery fluid to a temperature within the range of from 100 to 400° C. by providing heat from the energy delivery fluid to a first heat sink; and (C) passing the cooled energy delivery fluid to a second heat sink and providing heat from the cooled energy delivery fluid to the second heat sink.

2. The method of claim 1 wherein the acoustic energy is employed to generate refrigeration.

3. The method of claim 1 wherein the temperature of the cooled energy delivery fluid after providing heat to the first heat sink is at least 100 degrees Celsius less than the temperature of the energy delivery fluid prior to providing heat to the first heat sink.

4. The method of claim 1 wherein at least one of the first heat sink and the second heat sink comprises a Kalina cycle.

5. A method for employing heat energy comprising:

(A) employing heat from a hot energy source to produce hot energy delivery fluid having a temperature within the range of from 500 to 1200° C., and providing heat from the hot energy delivery fluid to a thermoacoustic engine to produce acoustic energy, said provision of heat resulting in the energy delivery fluid having a temperature within the range of from 350 to 750° C.;

(B) cooling the energy delivery fluid to a temperature within the range of from 100 to 400° C. by providing heat from the energy delivery fluid to a first heat sink; and (C) passing the cooled energy delivery fluid to a second heat sink and providing heat from the cooled energy delivery fluid to the second heat sink.

6. The method of claim 5 wherein the acoustic energy is employed to generate refrigeration.

7. The method of claim 5 wherein the temperature of the cooled energy delivery fluid after providing heat to the first heat sink is at least 100 degrees Celsius less than the temperature of the energy delivery fluid prior to providing heat to the first heat sink.

8. The method of claim 5 wherein at least one of the first heat sink and the second heat sink comprises a Kalina cycle.

* * * * *